United States Patent
Mylaraswamy et al.

(10) Patent No.: US 8,204,672 B2
(45) Date of Patent: Jun. 19, 2012

(54) APPARATUS AND METHOD FOR DETECTING OPERATIONAL ISSUES BASED ON SINGLE INPUT SINGLE OUTPUT SYSTEM DYNAMICS

(75) Inventors: Dinkar Mylaraswamy, Fridley, MN (US); Girija Parthasarathy, Maple Grove, MN (US)

(73) Assignee: Honeywell International, Inc., Morristown, NJ (US)

( * ) Notice: Subject to any disclaimer, the term of this patent is extended or adjusted under 35 U.S.C. 154(b) by 678 days.

(21) Appl. No.: 12/346,469

(22) Filed: Dec. 30, 2008

(65) Prior Publication Data

US 2010/0168951 A1   Jul. 1, 2010

(51) Int. Cl.
*G06F 17/00* (2006.01)

(52) U.S. Cl. ............ 701/103; 701/13; 701/29; 123/437; 123/438; 123/478; 123/525; 123/575; 261/50.1; 261/69.1; 261/74; 261/82; 261/84; 73/114.42; 137/595; 137/625.18; 60/243; 60/764

(58) Field of Classification Search .............. 701/13, 701/29, 103, 426, 438, 447, 450, 454, 483, 701/495, 516; 123/437, 438, 525, 575, 478, 123/463, 527, 526, 699, 557, 701; 261/44.4, 261/50.1, 69.1, 74, 82, 84, 121.4; 73/114.42; 431/12; 137/595, 625.18; 60/243, 764
See application file for complete search history.

(56) References Cited

U.S. PATENT DOCUMENTS

| | | | |
|---|---|---|---|
| 4,557,141 A | 12/1985 | Poirier et al. | |
| 4,608,820 A | 9/1986 | White et al. | |
| 4,679,151 A | 7/1987 | Morris et al. | |
| 4,947,816 A * | 8/1990 | Nakaniwa et al. | 123/406.46 |
| 5,279,107 A | 1/1994 | Meisner et al. | |
| 5,552,984 A | 9/1996 | Crandall et al. | |
| 5,771,861 A * | 6/1998 | Musser et al. | 123/357 |
| 6,067,030 A * | 5/2000 | Burnett et al. | 340/870.05 |
| 6,115,656 A | 9/2000 | Sudolsky | |
| 6,237,324 B1 | 5/2001 | Smith | |
| 6,831,466 B2 | 12/2004 | Down et al. | |
| 7,095,194 B2 | 8/2006 | Kro et al. | |
| 7,149,530 B1 * | 12/2006 | Arakawa et al. | 455/456.1 |
| 7,184,865 B2 | 2/2007 | Mangelsdorf | |
| 7,185,485 B2 | 3/2007 | Lewis | |
| 7,337,086 B2 | 2/2008 | Guralnik et al. | |
| 7,693,643 B2 * | 4/2010 | Kim et al. | 701/100 |

* cited by examiner

*Primary Examiner* — James Trammell
*Assistant Examiner* — McDieunel Marc
(74) *Attorney, Agent, or Firm* — Ingrassia Fisher & Lorenz, P.C.

(57) ABSTRACT

Methods and apparatus are provided for detecting an anomaly in fuel demand data and fuel supply data generated by a fuel metering system for an engine, The method comprises collecting the fuel demand data and the fuel supply data during operation of the fuel metering system, generating expected fuel supply data based on the collected fuel demand data and a nominal response model describing the expected behavior of the fuel metering system, and detecting the anomaly if a difference between the expected fuel supply data and the collected fuel supply data exceeds a predetermined threshold.

8 Claims, 6 Drawing Sheets

APPARATUS AND METHOD FOR DETECTING OPERATIONAL ISSUES BASED ON SINGLE INPUT SINGLE OUTPUT SYSTEM DYNAMICS

STATEMENT REGARDING FEDERALLY SPONSORED RESEARCH OR DEVELOPMENT

This invention was made with Government support under contract no. W911W6-08-C-0002 awarded by the Untied States Army. The Government has certain rights in the invention.

TECHNICAL FIELD

The present invention generally relates to vehicle maintenance systems, and more particularly relates to an apparatus and method for detecting operational issues based on single input single output system dynamics.

BACKGROUND

Modern electronic systems, such as the types used in avionics, often include a variety of integrated components and subsystems. Detecting and addressing operational issues that occur within each of these components and subsystems is necessary to ensure that these complex electronic systems function correctly. However, detecting and isolating operational issues associated with such systems can be difficult due to their integrated nature. For example, a fuel metering system for regulating the flow of fuel to an internal combustion engine may have a plurality of subcomponents (e.g., controllers, actuators, valves, etc.). In this case, an operational issue with the fuel system may be caused by any one of the fuel metering system subcomponents or by another engine system that interacts with the fuel metering system.

Accordingly, it is desirable to provide a system and method for detecting operational issues that occur within an electronic system. It is also desirable to provide a method for isolating the cause of an operational issue associated with an electronic system. Furthermore, other desirable features and characteristics of the present invention will become apparent from the subsequent detailed description of the invention and the appended claims, taken in conjunction with the accompanying drawings and this background of the invention.

BRIEF SUMMARY

A method is provided for detecting an anomaly in fuel demand data and fuel supply data generated by a fuel metering system for an engine. The method comprises collecting the fuel demand data and the fuel supply data during operation of the fuel metering system, generating expected fuel supply data based on the collected fuel demand data and a nominal response model describing the expected behavior of the fuel metering system, and detecting the anomaly if a difference between the expected fuel supply data and the collected fuel supply data exceeds a predetermined threshold.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
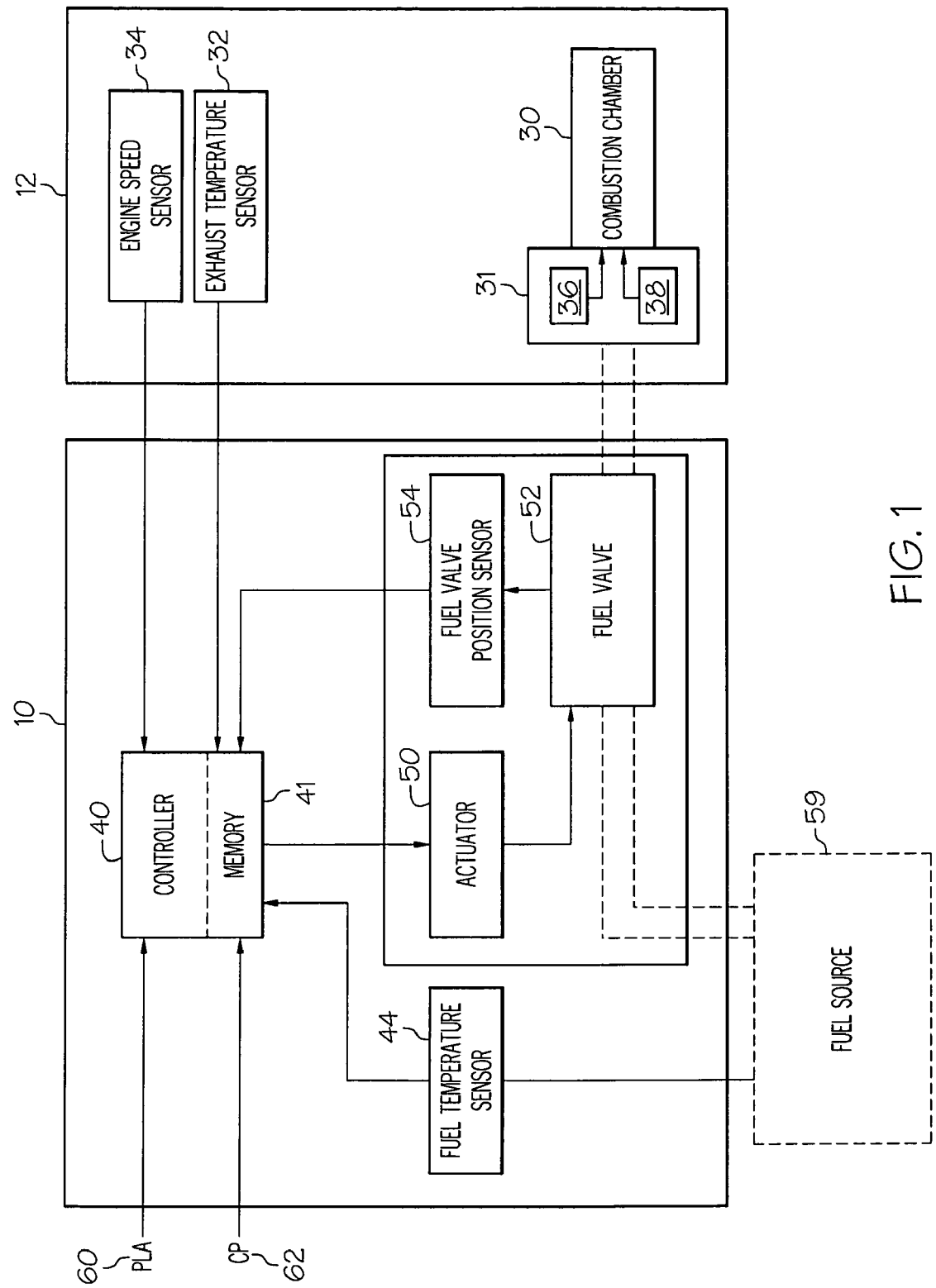
FIG. 1 is a block diagram of an exemplary fuel metering system for providing fuel to an internal combustion engine.

FIG. 1 is a block diagram of an exemplary fuel metering system 10 for providing fuel to an internal combustion engine 12. In the embodiment described below, the internal combustion engine is an aircraft engine. However, it will be understood by one who is skilled in the art that other engine types may also be used. Internal combustion engine 12 includes a combustion chamber 30, a fuel nozzle manifold 31, an exhaust temperature sensor 32, and an engine speed sensor 34. Combustion chamber 30 burns fuel and provides power to operate the internal combustion engine 12. The exhaust temperature sensor 32 generates signals describing the heat from the exhaust of the internal combustion engine 12. The engine speed sensor 34 generates signals describing the engine speed. The engine speed describes the rate at which one or more engine components (e.g., the rotors for a jet engine) are moving.

The fuel nozzle manifold 31 includes one or more primary nozzles 36 and one or more secondary nozzles 38. The primary nozzles 36 and secondary nozzles 38 atomize the fuel as it enters the combustion chamber 30. Primary nozzles 36 are smaller than the secondary nozzles 38 and provide increased control over the rate of fuel that is provided to the engine. At lower fuel flow rates (e.g., 75 PPH or less), the secondary nozzles 38 are closed to allow precise control of the amount of fuel entering combustion chamber 30 with the primary nozzles 36. At higher fuel flow rates, the secondary nozzles 38 are opened to provide for an increased fuel flow rate to the combustion chamber 30.

Fuel metering system 10 comprises a controller 40, memory 41, a fuel delivery system 42, and a fuel temperature sensor 44 for detecting the temperature of the fuel. Fuel delivery system 42 includes an actuator 50, a fuel valve 52, and a fuel valve position sensor 54. Fuel valve 52 may be placed in an open, partially open, or closed position to regulate the flow of fuel from a fuel source 59 to the combustion chamber 30 of the internal combustion engine 12. Actuator 50 is coupled to, and configured to adjust the position of, the fuel valve 52 based on signals received from controller 40. Fuel valve position sensor 54 generates signals regarding the position of the fuel valve 52.

Controller 40 may comprise any type of processor or multiple processors, single integrated circuits such as a microprocessor, or any suitable number of integrated circuit devices and/or circuit boards working in cooperation to accomplish the functions of a processing unit. The memory 41 may be electronic memory (e.g., ROM, RAM, or another form of electronic memory) configured to store instructions and/or data in any format, including source or object code. As depicted, controller 40 receives a Pitch Lever Angle (PLA) 60 and a Collective Pitch (CP) 62. In addition, controller 40 is coupled to and receives signals from the engine speed sensor 34, the exhaust temperature sensor 32, the fuel temperature sensor 42, and the fuel valve position sensor 54.

Controller 40 determines a fuel demand (F_dem) for the internal combustion engine 12. F_dem represents a desired flow rate (e.g., in pounds per hour) of fuel entering the combustion chamber 30. Controller 40 determines F_dem by calculating the difference between a desired engine speed and the actual engine speed. The desired engine speed is determined based on the PLA 60 and CP 62 and the actual engine speed is received via the engine speed sensor 34. If controller 40 determines that the actual engine speed is slower than the desired engine speed, it increases F_dem. Alternatively, if the actual engine speed is slower than the desired engine speed, controller 40 decreases F_dem. Controller 40 converts F_dem into a fuel demand signal that is transmitted to actuator 50. The fuel demand signal directs the actuator 50 to open or close the fuel valve 52 to increase or decrease the fuel flow rate in accordance with F_dem.

In addition, controller 40 receives a fuel supply signal from the fuel valve position sensor 54 describing the current position of fuel valve 52. Controller 40 converts the fuel supply signal into an actual fuel supply (F_supp). The fuel supply represents the actual flow rate for the fuel that is entering the combustion chamber 30. During normal operation of the fuel metering system 10, F_supp is substantially the same as F_dem. Any change in F_dem is followed by a substantially similar change in the F_supp. However, there will be a lag between the change in the F_dem and the change in F_supp corresponding to the time that it takes actuator 50 to receive the fuel demand signal and adjust the fuel valve 52.

As further described below, a nominal response model may be determined for describing the relationship between F_dem and F_supp within a fuel metering system 10 that is functioning properly. Controller 40 utilizes this nominal response model to detect operational issues associated with the fuel metering system 10. As further described below, controller 40 collects the F_dem and F_supp values generated during a predetermined sample period. Controller 40 then determines whether the collected data follows the nominal response model within a predetermined threshold. If the collected follows the nominal response model within the predetermined threshold, controller 40 determines that the fuel metering system is functioning properly. However, if the collected data does not follow the nominal response model within the predetermined threshold, controller 40 determines that the collected data has one or more anomalies that may be indicative of an operational issues associated with the fuel metering system 10. In this case, controller 40 utilizes one or more external data sources (e.g., such as the fuel temperature sensor 44 or the exhaust temperature sensor 32) to isolate the cause of the operational issue.

As described above, the fuel metering system 10 is an example of a single output single input (SISO) system, wherein the fuel demand is the system input and the fuel supply is the system output. It should be noted that while embodiments are described herein with regard to a fuel metering system 10, it will be understood by one who is skilled in the art that other SISO systems may also be used in connection with the present invention.

Figure 2:
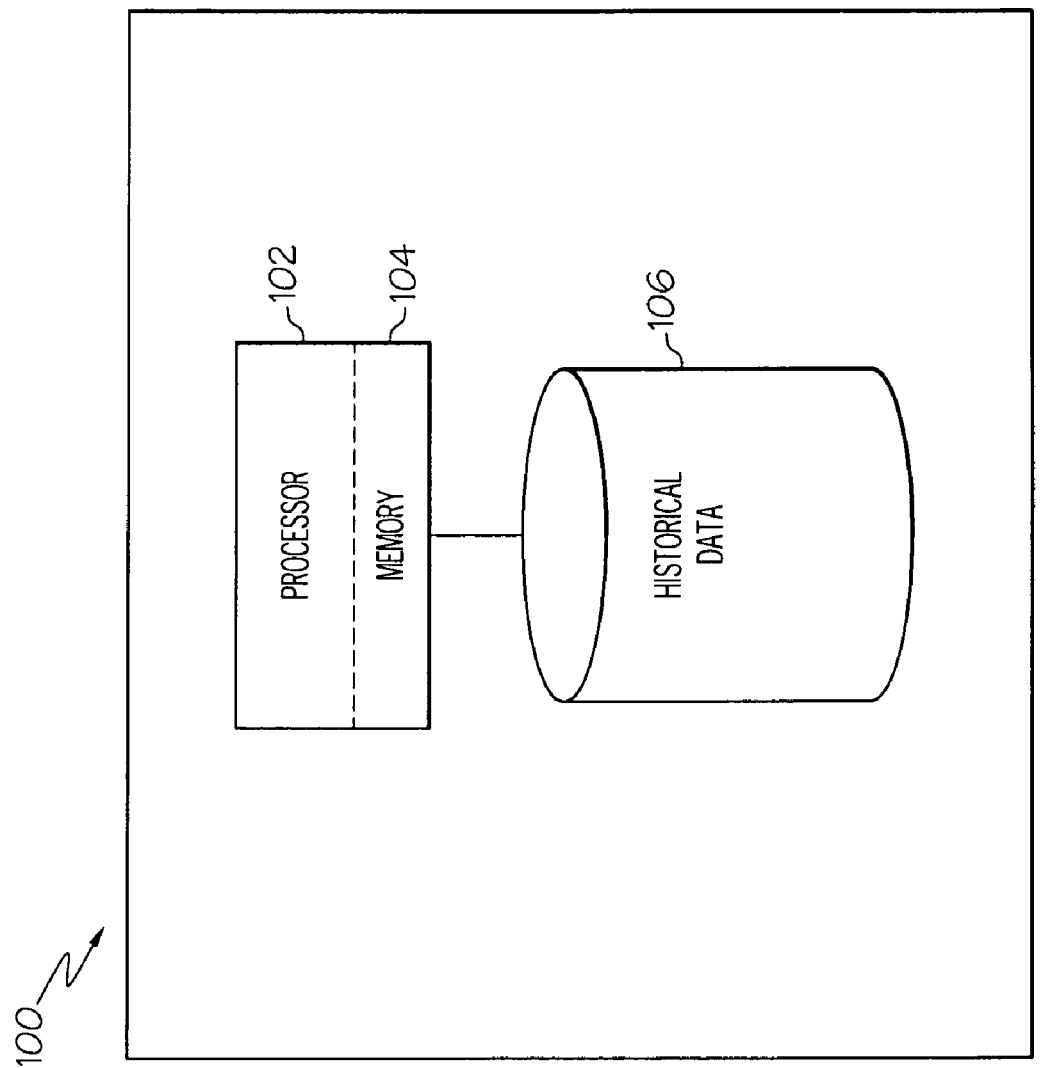
FIG. 2 is a block diagram of an exemplary apparatus for determining a nominal response model for an SISO system.

FIG. 2 is a block diagram of an exemplary apparatus 100 for determining a nominal response model for an SISO system (e.g., the fuel metering system 10 of FIG. 1). As depicted, apparatus 100 includes a processor 102, memory 104, and a historical data source 106. Processor 102 may comprise a programmable logic control system (PLC), a microprocessor, or any other type of electronic controller. It may include one or more components of a digital and/or analog type and may be programmable by software and/or firmware. The memory 104 may be electronic memory (e.g., ROM, RAM, or another form of electronic memory) configured to store instructions and/or data in any format, including source or object code. The historical data source 106 comprises a storage device, such as a hard drive, for storing historical data. The historical data comprises a plurality of data sets generated during previous operation of one or more fuel metering systems. Each data set includes fuel demand data (system input data) and fuel supply data (e.g., system output data) generated at various times during a startup or shutdown of an internal combustion engine, or at any other time period when the fuel demand is likely to change. The fuel demand data comprises a plurality of F_dem values and the fuel supply data comprises a plurality of corresponding F_supp values for various points in time during the time period.

As described above, under normal operational conditions F_supp will follow F_dem as per the intrinsic dynamics of the actuator 50 and fuel valve 52 (FIG. 1). Thus, by analyzing data sets that are generated by a fuel metering system 10 that is operating normally, processor 102 is able to identify a nominal response model that predicts how the fuel supply data will change in response to a change in the fuel demand data. In the majority of cases, a fuel metering system will function as it is designed to and, therefore, most of the data sets stored on the historical data source 106 will describe fuel metering systems that are functioning properly. However, the historical data source 106 may also include data sets that are generated by fuel metering systems having one or more operational issues. These data sets may include anomalies and should not be used to determine the nominal response model. Thus, processor 102 must first analyze the historical data to identify only the data sets that describe fuel systems that do not have anomalies. Processor 102 may then determine the nominal response model based on the identified data sets.

Figure 3:
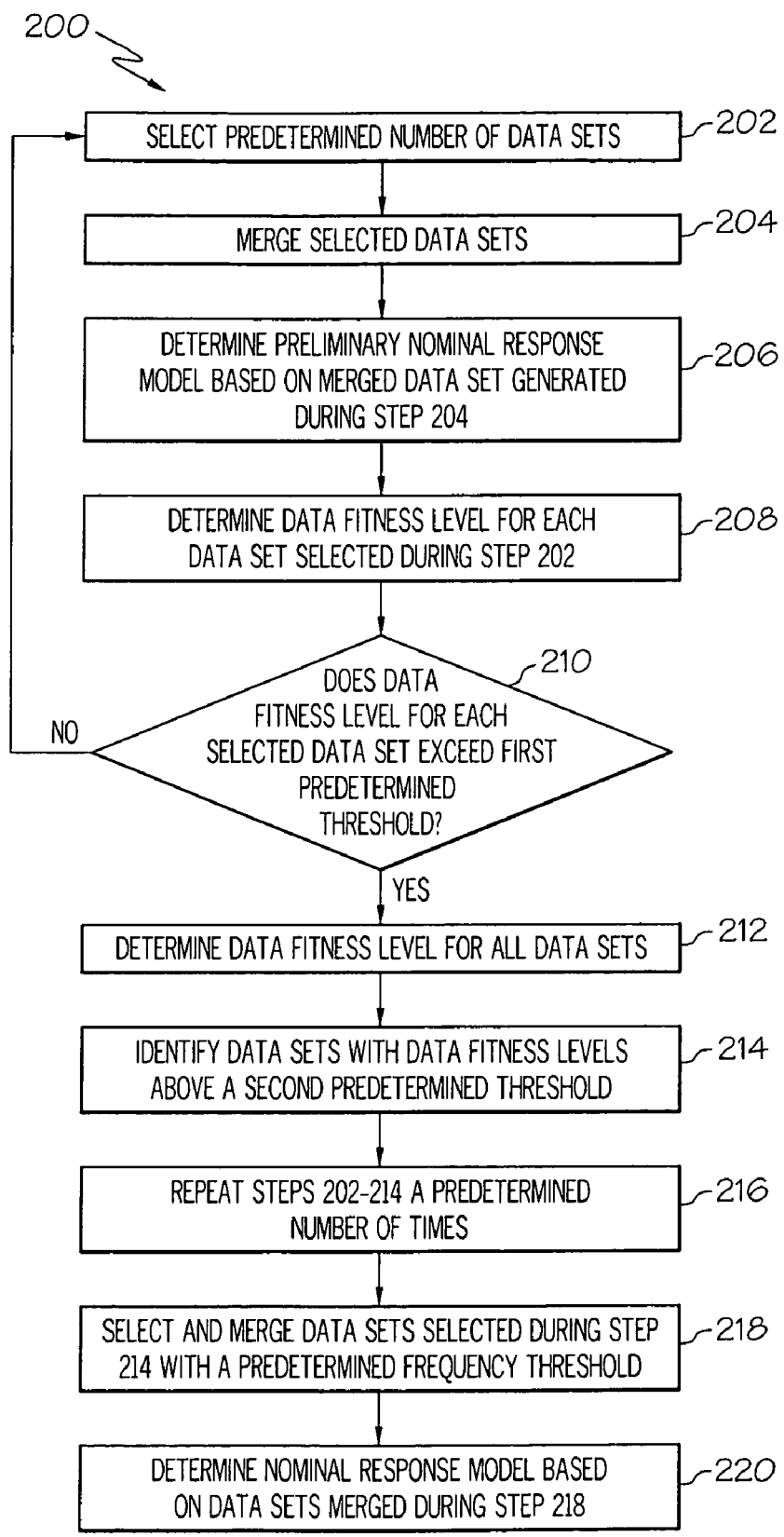
FIG. 3 is a flowchart of an exemplary method for determining a nominal response model for a fuel metering system.

FIG. 3 is a flowchart of an exemplary method 200 for determining a nominal response model for a SISO system (e.g., the fuel metering system 10 of FIG. 1). With reference to FIGS. 2 and 3, method 200 is performed by processor 102 as it analyzes the data sets stored on the historical data source 106. During steps 202-216, processor 102 utilizes a statistical bootstrap technique to identify data sets that describe fuel metering systems that are functioning properly. Processor 102 then uses the identified data sets to determine the nominal response model during step 220. It should be noted that while method 200 is described below with regard to a fuel metering system. Alternative embodiments may be utilized to generate nominal response models for other SISO systems as well.

During step 202 of method 200, processor 102 randomly selects a predetermined number of data sets from the historical data. The selected data sets are then merged into one large data set (step 204).

Next, during step 206, processor 102 identifies a preliminary nominal response model that describes the merged data set. The preliminary nominal response model generated an expected fuel supply (F_supp') for each time period (t) of the merged data set based on the fuel demand (F_dem) during that time period. In one embodiment, the nominal response model is expressed as an ARX (auto-regressive) model having the form:

$$A(q)F\_supp'(t) = B(q)F\_dem(t-nk) + e(t) \quad (1)$$

where:
q is a delay operator,
nk is the input lag, and
e(t) is the zero mean unit covariance Gaussian noise.

Model parameters A and B are coefficients vectors for the delay operator q and can be expressed as follows:

$$A(q) = 1 + (a_1)q^{-1} + \ldots + (a_{na})q^{-na}, \text{ na order of } A(q) \quad (2)$$

$$B(q) = (b_1) + (b_2)q^{-1} + \ldots + (b_{nb})q^{-nb}, \text{ nb order of } B(q) \quad (3)$$

Equation 1 may be rewritten in the form:

$$F\_supp'(t) + (a_1)F\_supp'(t-1) + \ldots + (a_{na})F\_'(t-na) = (b_1)F\_dem(t-nk) + \ldots + (b_{nb})F\_dem(t-nk-nb+1) + e(t) \quad (4)$$

In equations 2-4, na is the number of previous fuel supply values, and nb is the number of previous demand supply values, in the merged data set. Further, nk represents a lag or delay that is required for the fuel metering system to respond to a change in the fuel demand. In this case, nk may be set equal to one because actuator 50 and fuel valve 52 of FIG. 1 are both configured to respond immediately to a change in F_dem.

During step 206, processor 102 identifies values for model parameters A and B that minimize the differences between the expected fuel supply values predicted by the preliminary nominal response model and the actual fuel supply values for each time period in the merged data set. In one embodiment, the values for the model are determined using a least squares approach provided by Matlab's System ID Toolbox.

Next, during step 208, processor 102 utilizes the preliminary nominal response model to identify a data fitness level for the data sets selected during step 202. The data fitness level is a measure of the correlation between a data set and the preliminary response model. In one embodiment, the data fitness level is a percentage. For example, the percentage may be determined based on the following equation:

$$\text{Data Fitness Level} = 100*(1 - RMS1/RMS2) \quad (5)$$

In this case, RMS1 is the root mean square of the difference between the expected fuel supply data predicted by the preliminary nominal response model and the actual fuel supply data from the data set. RMS2 is the root mean square of the difference between the actual fuel supply for each time period in the data set and the mean value of all the fuel supplies listed in the data set. It should be noted that other methods for determining a data fitness level may also be utilized during step 208.

Processor 102 compares each of the data fitness levels determined during step 208 with a first predetermined threshold (step 210). If each data fitness level exceeds the first predetermined threshold (e.g., 80%), then processor 102 proceeds to step 212. In this case, each of the data sets selected during step 202 do not include anomalies and, therefore, describe fuel metering systems that are functioning properly. Alternatively, if the fitness level for one or more of the data sets does not exceed the first predetermined threshold, then one or more of the data sets includes anomalous data. In this case, processor 102 returns to step 202 and repeats steps 202-210 until it is able to determine a preliminary nominal response model utilizing only data sets that do not include such anomalies.

During step 212, processor 102 utilizes the preliminary nominal response model to determine a data fitness level for every data set stored in historical data source 106. Processor 102 may utilize the method described above for determining the data fitness level of a data set. Processor 102 then identifies and stores information regarding the data sets having a data fitness threshold above a second predetermined threshold (e.g., 70%) during step 214. It should be noted that if a data set has a data fitness level above the second predetermined threshold then it does not include anomalies and, therefore, is likely to describe a fuel metering system that performs correctly.

Processor 102 repeats steps 202-214 a predetermined number of times (e.g., 200) during step 216. Each time step 214 is performed, processor 102 identifies a group of data sets having a data fitness level that exceeds the second predetermined threshold. During step 218, processor 102 selects and merges the data sets identified during the iterations of step 214 with a predetermined frequency threshold. For example, during step 218 processor 102 may select and merge the data sets that were identified during more than a predetermined percentage (e.g., 90%) of the iterations of step 214.

Finally, during step 220 processor 102 generates a nominal response model based on the merged data set generated during step 218. The nominal response model is generated using substantially the same method for generating the preliminary nominal response model as described above with regard to step 206.

Figure 4:
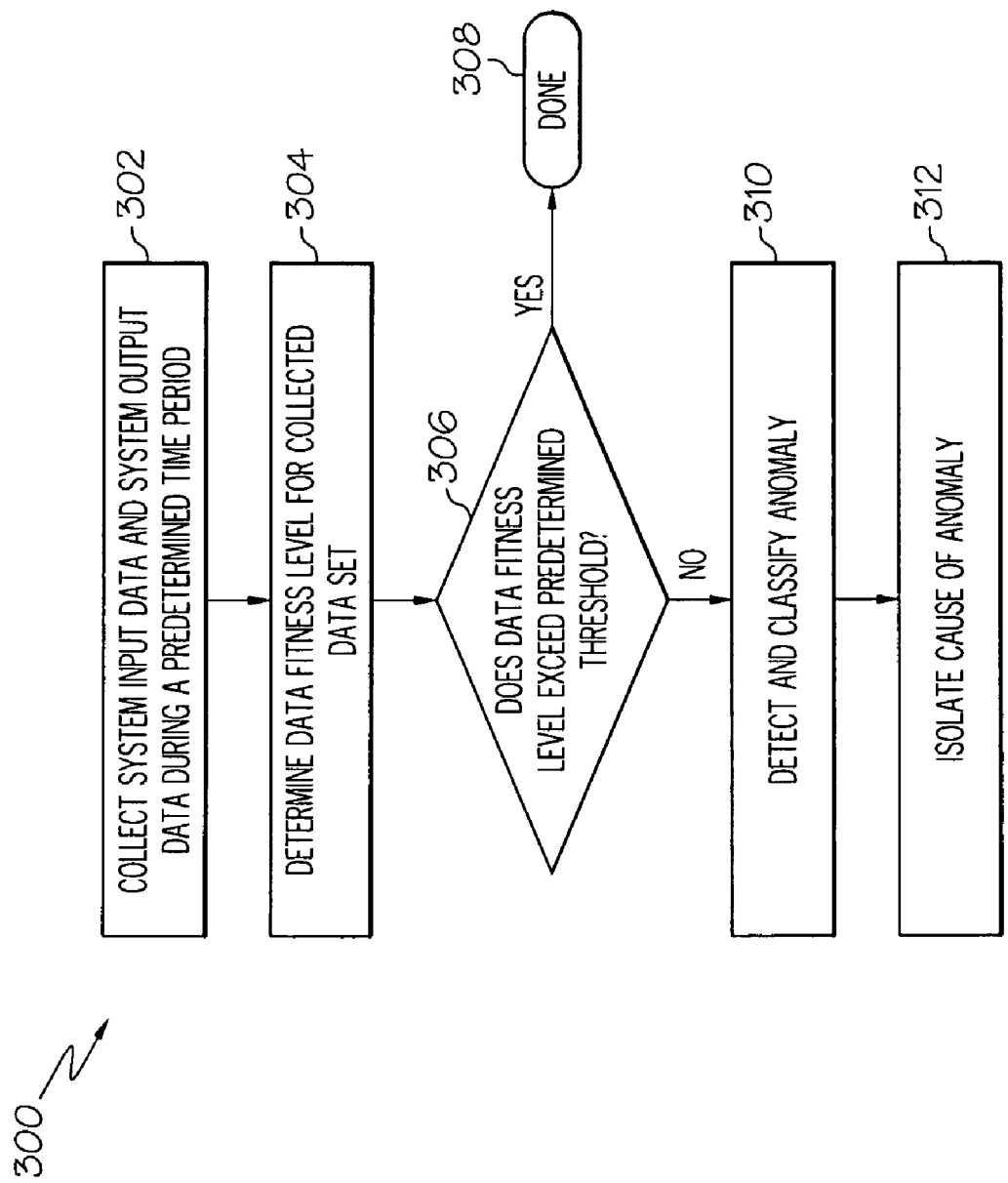
FIG. 4 is a flowchart of an exemplary method for detecting anomalies in the system inputs and system outputs for an SISO system.

As described above, the nominal response model identified during method 200 may be used by controller 40 to detect anomalies in the system inputs (e.g., fuel demand) and system outputs (e.g., fuel supply) generated by an SISO system (e.g., the fuel metering system 10 of FIG. 1). FIG. 4 is a flowchart of an exemplary method 300 for detecting anomalies in the system inputs and system outputs for an SISO system. With reference to FIGS. 1 and 4, the steps of method 300 are performed by controller 40.

During step 302 of method 300, controller 40 collects and stores a data set comprising fuel demand data and fuel supply data during a time period (hereinafter, the "sample time period") having a fixed duration (e.g., 30 seconds). The fuel demand data will comprise F_dem values collected at sequential time intervals (e.g., once every 5 milliseconds) during the sample time period. The fuel supply data will comprise corresponding F_supp values collected at the same time intervals. Preferably, the fuel demand data and fuel supply data is collected during a sample time period when the fuel demand is changing, such as during a startup or shutdown of the internal combustion engine 12.

Next, during step 304 controller 40 determines whether the collected data set follows the nominal response model identified during method 200. In one embodiment, controller 40 identifies a data fitness level for the collected data set. Controller 40 may utilize the method for determining the data fitness level of a data set described above with respect to step 208 (FIG. 3) of method 200. Controller 40 then compares the data fitness level with a predetermined threshold (step 304). If the data fitness level exceeds the predetermined threshold (e.g., 70%), controller 40 determines that the fuel metering system is functioning properly because it is functioning in a predictable manner that is consistent with historical data for similar fuel metering systems. In this case, controller 40 proceeds to step 308 and method 300 is terminated.

Alternatively, if the data fitness level does not exceed the predetermined threshold, then the collected data include anomalous data. In this case, controller 40 proceeds to step 310. In this case, the fuel metering system 10 (FIG. 1) is not functioning in a manner that is consistent with the historical data for fuel metering systems that are functioning properly, indicating that there is an anomaly with the collected data set that may be the result of an operational issues.

During step 310, controller 40 analyzes the collected data to classify the anomaly detected during step 306. Two common types of anomalies that may be present in the collected data set are oscillation anomalies and offset anomalies. An oscillation anomaly occurs when the collected fuel demand data has an amount of variability that is larger than expected for a fuel metering system that is functioning properly, indicating that controller 40 is constantly determining that there is a difference between the desired engine speed and the actual engine speed. An offset anomaly occurs when there is a substantial difference between the total amount of fuel demanded and the total amount of fuel supplied for the sample time period. After controller 40 detects and classifies the anomaly it uses one or more external data sources (e.g., the fuel temperature sensor 44 or the exhaust temperature sensor 32) to isolate an operational issue that is causing the anomaly (step 312).

Figure 5:
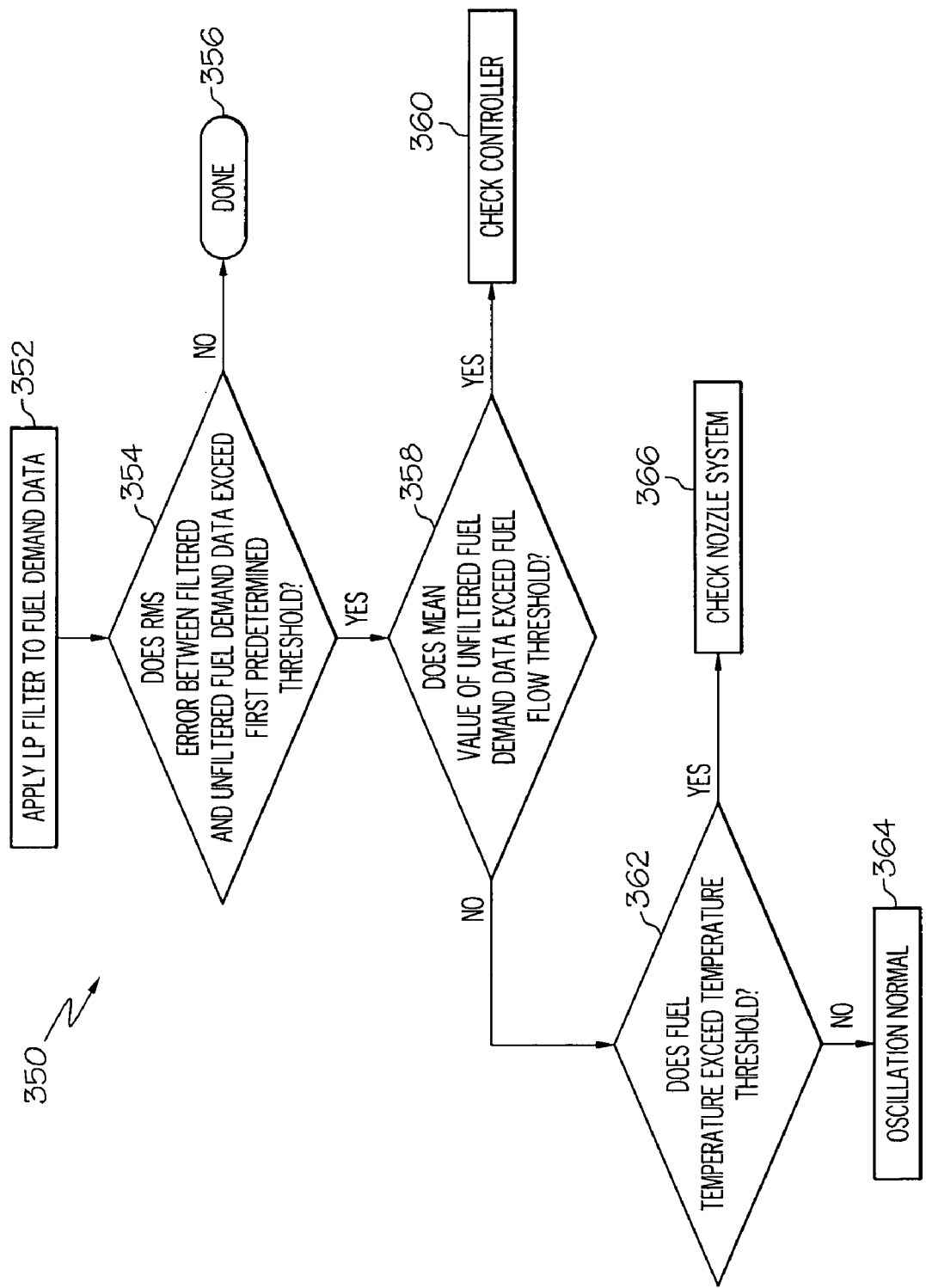
FIG. 5 is a flowchart of an exemplary method for detecting, and isolating the cause of, an oscillation anomaly in the collected data set.

FIG. 5 is a flowchart of an exemplary method 350 for detecting, and isolating the cause of, an oscillation anomaly in the collected data set. With reference to FIGS. 1 and 5, during method 350 controller 40 analyses the collected fuel demand data to determine whether there is a high amount of variability in the F_dem values. A high amount of variability in fuel demand data is indicative oscillations resulting from controller 40 determining that the desired engine speed and the actual engine speed are not the same.

During step 352, controller 40 applies a Low Pass filter (LP filter) to the fuel demand data. The LP filter allows fuel demand data having an amount of variability that is below a predetermined frequency threshold to pass through unchanged. However, if the amount of variability in the fuel demand data is above the predetermined frequency threshold, the LP filter reduces variability. Preferably, the predetermined frequency threshold for the LP filter is set at a level that only allows fuel demand data having an expected amount of variability to pass through unchanged. Thus, the LP filter has the effect of smoothing fuel demand data having a high degree of variability.

Next, controller 40 determines if the root mean square (RMS) error between the unfiltered fuel demand data and the filtered fuel demand data exceeds a predetermined threshold (step 354). If the RMS error between the unfiltered fuel and filtered fuel demand data does not exceed the predetermined threshold, the controller 40 determines that the fuel demand data is not oscillating and method 300 terminates (step 356). Alternatively, if the RMS error exceeds the predetermined threshold, controller 40 proceeds to step 358. In this case, the unfiltered fuel demand data has a high amount of variability that was reduced by the LP filter. As described above, a high amount of variability is indicative of fuel demand data that is oscillating.

During step 358, controller 40 determines if the mean value of the fuel demand data exceeds a predetermined fuel flow rate threshold. In some embodiments, the fuel flow rate threshold is set at the fuel flow rate (e.g., 75 PPH) at which the secondary nozzles 38 of the fuel nozzle manifold 31 would normally be engaged. If oscillations are detected and the average fuel demand is above the fuel flow rate threshold, then the primary nozzles 36 and secondary nozzles 38 have both engaged and functioning properly. In this case, the controller 40 should be checked to ensure that it is determining the F_dem values correctly (step 360).

Alternatively, if oscillations are detected and the average fuel demand is below the fuel flow rate threshold, there may be an operational issues with the primary nozzles 36 and controller 40 proceeds to step 362 of method 350. For example, the primary nozzles 36 may not be atomizing the fuel properly, resulting in poor combustion and reduced engine speeds. In response, controller 40 will increase the F_dem value causing the secondary nozzles 38 to open prematurely (e.g., before the fuel flow rate has reached the predetermined threshold). However, the secondary nozzles 38 are large and more difficult to control at low fuel rates. As a result, the engine speed and resulting F_dem values determined by controller 40 will vary.

During step 362, controller 40 determines if the fuel temperature exceeds a predetermined temperature threshold. Controller 40 receives the fuel temperature from the fuel temperature sensor 44. If the fuel temperature is below the temperature threshold, then the internal combustion engine 12 is cold (e.g., such as during a cold start). Oscillation in the fuel demand data is normal such engine conditions (step 364). Alternatively, if the fuel temperature is above the temperature threshold, then the internal combustion engine is not cold. In this case, the detected oscillation is likely the result of an operational issue with the fuel nozzle manifold 31 (step 366).

Figure 6:
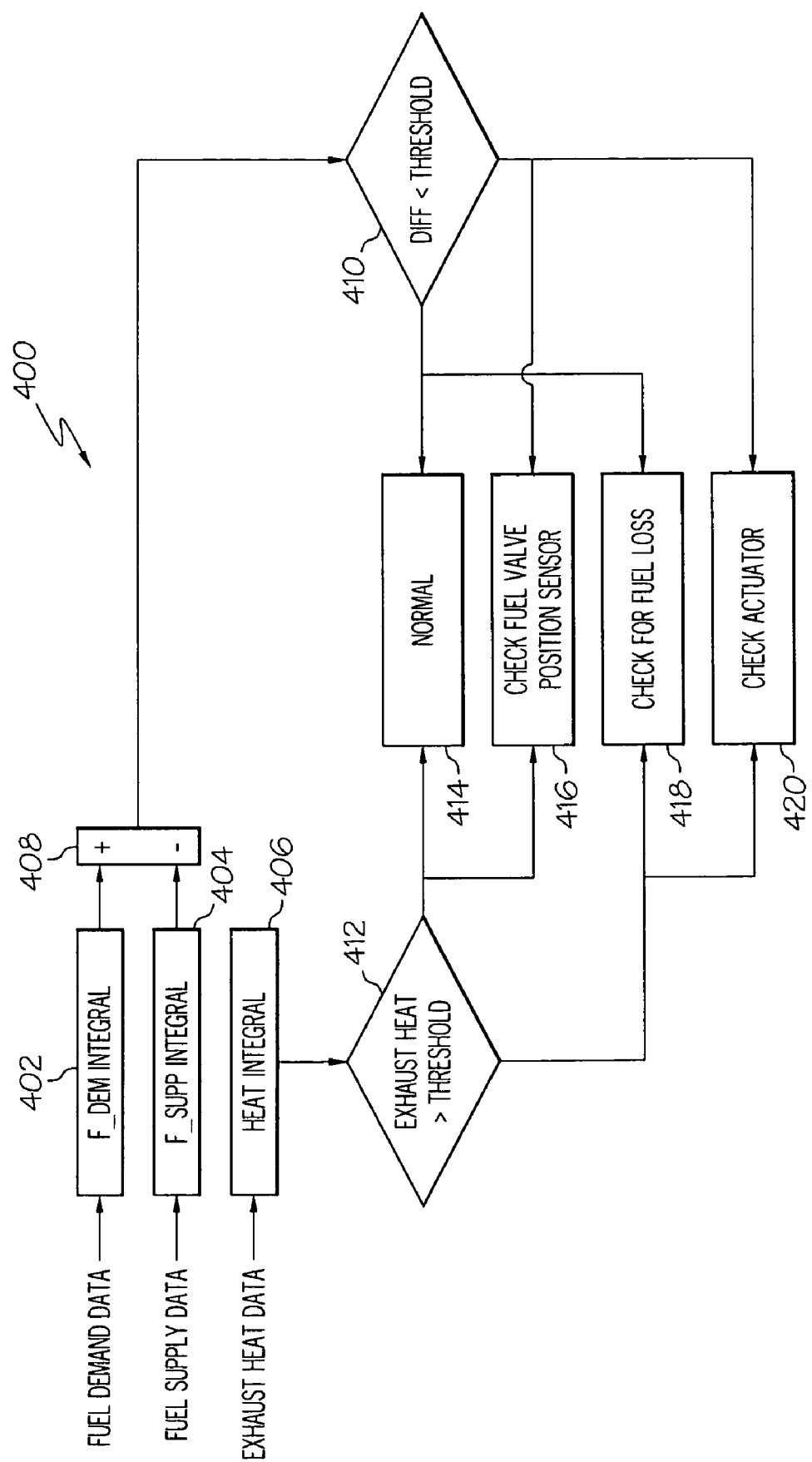
FIG. 6 is a schematic of an exemplary method for detecting, and isolating the cause of, an offset anomaly in the collected data set.

FIG. 6 is a schematic of an exemplary method 400 for detecting, and isolating the cause of, an offset anomaly in the collected data set. With reference to FIGS. 1 and 6, during normal operation of the fuel metering system, the total amount of fuel supplied to the combustion chamber 30 should be substantially the same as the total amount of fuel demanded by controller over time. An offset occurs when there is a substantial difference between the total amount of fuel supplied and the total amount of fuel demanded during time period.

During step 402, controller 40 integrates the fuel demand data with respect to time to determine a total amount of fuel demanded by controller 40 over a predetermined time period. The predetermined time period will comprise part, or all, of the sample time window. In addition, during step 404 controller 40 integrates the fuel supply data with respect to time to determine a total amount of fuel supplied to combustion chamber 30 during the predetermined time period. Finally, controller 40 integrates the exhaust heat data generated by the exhaust temperature sensor 32 with respect to time to determine the total amount of exhaust heat generated during the predetermined time window (step 406).

Controller 40 determines the difference between the total amount of fuel demanded and the total amount of fuel supplied during the predetermined time period (step 408). If this difference is greater than a first predetermined threshold, the controller 40 detects an offset anomaly (step 410). Controller 40 also determines if the total amount of exhaust heat exceeds a second predetermined threshold during step 412. If the total amount of exhaust heat exceeds the predetermined threshold then fuel is being delivered to, and burned in, the combustion chamber 30 of internal combustion engine 12.

As depicted, if there is no offset anomaly and that fuel is being burned in the combustion chamber 30, controller 40 determines that the fuel metering system is functioning properly (step 414). In this case the total amount of fuel supplied during the time period is substantially the same as the total amount of fuel demanded and the fuel is being delivered to the combustion chamber 30. Alternatively, if there is an offset anomaly and fuel is being burned in combustion chamber 30, controller 40 determines that there is an operational issue with the fuel valve position sensor 54 (step 416). In this case, the fuel valve position sensor 54 indicates that the fuel supply is not substantially the same as the fuel demand, but the exhaust heat indicates that fuel is being received and burned in the combustion chamber 30. Such circumstances are indicative of a fuel valve position sensor 54 that is not detecting the position of the fuel valve correctly.

If there is no offset anomaly and fuel is not being burned in the combustion chamber 30, controller 40 determines that there is a fuel loss issue (step 418). In this case, the fuel valve position sensor 54 indicates that the fuel supply is substantially the same as the fuel demand, but the exhaust heat indicates that less than the expected amount of fuel is being received and burned in the combustion chamber 30. Such circumstances may be indicative of a fuel leak, an operational issue with the fuel delivery system (e.g., a problem with the fuel nozzle manifold 31), or other issues that might affect the supply of fuel to the combustion chamber 30.

Finally, if there is an offset issue and fuel is being burned in the combustion chamber 30, controller 40 determines that there is an issue with the actuator 50 (step 420). In this case, the total amount of fuel supplied during the time period is not substantially the same as the total amount of fuel demanded, but some fuel is being delivered to the combustion chamber. Such conditions are indicative of an actuator that is not responding correctly.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for detecting an anomaly in fuel demand data and fuel supply data generated by a fuel metering system for an engine, the method comprising:
    collecting, by a processor, the fuel demand data and the fuel supply data during operation of the fuel metering system;
    generating, by the processor, expected fuel supply data based on the collected fuel demand data and a nominal response model describing the expected behavior of the fuel metering system;
    detecting, by the processor, the anomaly if a difference between the expected fuel supply data and the collected fuel supply data exceeds a predetermined threshold; and
    isolating, by the processor, the cause of the detected anomaly based on additional analysis of the collected historical data.

2. The method of claim 1, further comprising the step of generating the nominal response model based on historical data comprising fuel demand data and fuel supply data generated during previous operation of the fuel metering system.

3. The method of claim 1, wherein step of collecting further comprises:
    collecting fuel demand data and fuel supply data at predetermined time intervals during a sample time period having a predetermined length.

4. The method of claim 3, wherein the step of detecting further comprises detecting the anomaly if the root means square of the difference between the expected fuel supply data and the collected fuel supply data exceeds a predetermined threshold.

5. The method of claim 4, wherein the step of isolating further comprises:
    applying a low pass filter having a predetermined frequency threshold to the collected fuel demand data; and
    classifying the anomaly as an oscillation anomaly if the difference between the filtered fuel demand data and the unfiltered fuel demand data exceeds a predetermined threshold.

6. The method of claim 5, further comprising a fuel temperature sensor for detecting the temperature of the fuel that flows to the engine and wherein the step of isolating further comprises determining the cause of the oscillation anomaly based on the fuel temperature.

7. The method of claim 4, wherein the step of isolating further comprises:
    determining the total amount of fuel demanded during a predetermined time period based on the collected fuel demand data;
    determining the total amount of fuel supplied during the predetermined time period based on the collected fuel supply data; and
    detecting an offset anomaly if the difference between the total amount of fuel demanded and the total amount of fuel supplied is greater than a predetermined threshold.

8. The method of claim 7, further comprising an engine exhaust heat sensor and wherein the step of isolating further comprises:
    determining the total amount of heat expelled from the engine during the predetermined time period; and
    detecting the cause of the offset anomaly based on the total amount of heat expelled from the engine during the predetermined time period.

* * * * *